United States Patent
Zhang

[11] Patent Number: 6,038,693
[45] Date of Patent: Mar. 14, 2000

[54] ERROR CORRECTION SCHEME FOR AN INTEGRATED L2 CACHE

[75] Inventor: Kevin X. Zhang, Portland, Oreg.

[73] Assignee: Intel Corporation, Santa Clara, Calif.

[21] Appl. No.: 09/159,462

[22] Filed: Sep. 23, 1998

[51] Int. Cl.[7] .............................. G06F 11/10; G11C 29/00
[52] U.S. Cl. ........................................... 714/768; 714/773
[58] Field of Search ...................................... 714/768, 773

[56] References Cited

U.S. PATENT DOCUMENTS

| | | | |
|---|---|---|---|
| 4,791,642 | 12/1988 | Taylor et al. ............................... | 371/38 |
| 4,995,041 | 2/1991 | Hetherington et al. ................. | 371/40.1 |
| 5,533,189 | 7/1996 | Cheong et al. ..................... | 395/182.04 |
| 5,642,494 | 6/1997 | Wang et al. ............................... | 395/467 |
| 5,678,020 | 10/1997 | Singh et al. ............................... | 395/427 |
| 5,701,503 | 12/1997 | Singh et al. ............................... | 395/800 |
| 5,867,511 | 2/1999 | Arimilli et al. .......................... | 371/51.1 |
| 5,909,694 | 6/1999 | Gregor et al. ........................... | 711/128 |
| 5,974,514 | 10/1999 | Andrewartha et al. .................. | 711/166 |
| 5,978,887 | 11/1999 | Yeager ..................................... | 711/127 |

OTHER PUBLICATIONS

Saxena et al., "Fault-Tolerant Features in the HaL Memory Management Unit", IEEE Transactions on computers, vol. 46, No. 2, Feb. 1995, pp. 170–180.

*Primary Examiner*—Stephen M. Baker
*Attorney, Agent, or Firm*—Blankely, Sokoloff, Taylor & Zafman LLP

[57] ABSTRACT

A multi-way, set-associative cache utilizes a single ECC code in which the ECC bits are evenly distributed among the tag arrays to protect all of the multi-way tags. The cache includes a plurality of data arrays—one for each way of the cache—along with a corresponding plurality of tag arrays. The ECC bits are appended to each tag entry for one of the multiple ways. A single ECC logic block is shared by the tag arrays to detect tag errors. Additional comparator logic is coupled to the tag arrays to perform tag matching.

9 Claims, 4 Drawing Sheets

ERROR CORRECTION SCHEME FOR AN INTEGRATED L2 CACHE

FIELD OF THE INVENTION

The present invention relates generally to the field of integrated circuits; more particularly, to methods and apparatus for detecting and correcting errors in large semiconductor memories.

BACKGROUND OF THE INVENTION

Cache memories have been used to maximize system performance, while maintaining reasonable system costs. A cache memory is a very fast local storage memory that is used by the microprocessor to hold frequently requested copies of code and data. A typical cache memory system comprises a hierarchy of memory structures, which usually includes a local (L1), on-chip cache that represents the first level in the hierarchy. A secondary (L2) cache is often associated with the microprocessor for providing a intermediate level of cache memory between the processor and main memory.

Referring to the computer system 10 of FIG. 1, processor 11 is shown coupled to a system bus 14. Bus 14 provides access to a main memory 13. An additional backside bus 15 couples processor 11 to L2 cache memory 12. In other embodiments, L2 cache memory 12 may also be coupled to system bus 14 via its own dedicated bus. Most often, L2 cache memory 12 comprises a static random access memory (SRAM) that includes data, a cache directory and cache management logic. The data is stored in a data array.

The cache directory often includes a tag array, tag status bits, and least recently used (LRU) bits. (Each directory entry is called a "tag".) The tag RAM contains the main memory addresses of code and data stored in the data cache RAM plus additional status bits used by the cache management logic. By way of example when processor 11 requests information from main memory 13, the memory request is commonly sent to cache memory 12. The cache management logic takes the memory request from processor 11 and compares it to the stored addresses in the tag RAM. When the memory request address matches an address stored in the tag RAM (i.e., a "hit"), the cache returns the information from the data cache RAM. If the memory request address does not match any entry in the tag RAM directory (i.e., a "miss"), the memory request is passed on to main memory 13. Often times, when the information requested is returned from the main memory to processor 11, a copy is also stored in L2 cache memory 12 for future use.

FIG. 2 is a detailed block diagram of a prior art L2 cache memory 12. Memory 12 includes an address latch 21, tag array 22, tag comparison logic 25, data buffer 27, data array 28, select logic multiplexer 29, and data output register 30. Chunk select logic block 31 is also utilized to select particular chunks of data from output register 30. Control logic block 26 is coupled to components in the L2 cache memory 12 to control their operation in response to control signals provided by the microprocessor as well as other signals generated within the L2 cache memory.

The basic operation of cache 12 is described as follows. First, address latch 21 receives an address from bus 15. Certain bits of the address select one of the sets in tag array 22. The contents of the set are compared with certain bits of the address by comparison logic block 25 and the result is used to select the appropriate way in the multiplexer select logic block 29. Practitioners in the art will appreciate that FIG. 2 depicts a set-associative cache organization in which the data cache RAM is divided into banks of memory, or "ways". For example, a 4-way set-associative cache is divided into four ways: way0, way1, way2, and way3.

Bits of the address stored in address latch 21 are also utilized to select which chunk of the data in each way gets set to the data bus via chunk select logic multiplexer block 31. In the conventional cache memory organization shown in FIG. 2, status signals from tag array 22 are also returned to the bus through control logic unit 26. A cache memory system such as those shown in FIGS. 1 and 2 is described in further detail in U.S. Pat. Nos. 5,642,494; 5,701,503; and 5,678,020, which patents are assigned to the assignee of the present application.

Due to the possibility of errors in data transmission, L2 cache memories have been developed to support data integrity through the use of parity or error correction code (ECC) bits. Error correction code bits are typically utilized to cover transmission errors on the backside bus and storage errors in the tag array and data arrays of the cache memory. By way of example, one prior art cache memory system includes a 4-way set-associative SRAM data array that is logically organized as a 4×1K×288. The 288 bit word length is comprised of four seventy-two bit wide chunks, where each chunk contains sixty-four data bits plus eight ECC bits.

As the integration level of microprocessors continues to increase, very large secondary caches have been incorporated onto the same semiconductor die as the central processing unit (CPU). To ensure the reliability of these large memories, error correction codes must be used. While in the past it has been relatively straightforward to implement ECC protection on the data array of a L2 cache memory with small area overhead, it has been much more difficult to implement ECC on the tag array of the secondary cache memory. The reason why is because the secondary cache memory is usually multi-way associative (e.g., 4-way set-associative). This means that tag entries of each way for each address have to be accessed at the same time in order to determine if there is a cache hit or miss. The tag bits each way also have to be protected. This results in a large area overhead that increases the silicon die size.

As will be seen, the present invention provides a novel error correction scheme for an integrated L2 cache tag array that uses a single set of ECC code bits to cover multiple way tags. The result is a significant decrease in the overall area required to implement ECC in a tag array of the L2 cache memory.

SUMMARY OF THE INVENTION

A multi-way, set-associative cache is provided with a shared error correction code (ECC) scheme. In an exemplary embodiment, a single ECC code is used to protect all four-way tags for an integrated L2 cache memory. The cache includes a plurality of data arrays—one for each way of the cache—along with a corresponding plurality of tag arrays. For the case where the tag is 18 bits long (18 bits×4 ways=72 bits), the single ECC only needs 8 ECC bits, which are evenly distributed among the tag arrays. With only 2 ECC bits appended to each tag entry for one of the 4 ways, the present invention advantageously reduces die area avoids wiring congestion.

A single ECC logic block is shared by the tag arrays to detect tag errors. Additional comparator logic is coupled to the tag arrays to perform tag matching.

DESCRIPTION OF THE DRAWINGS

The present invention is illustrated by way of example, and not by way of limitation, in the figures of the accompanying drawings, wherein.

DETAILED DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
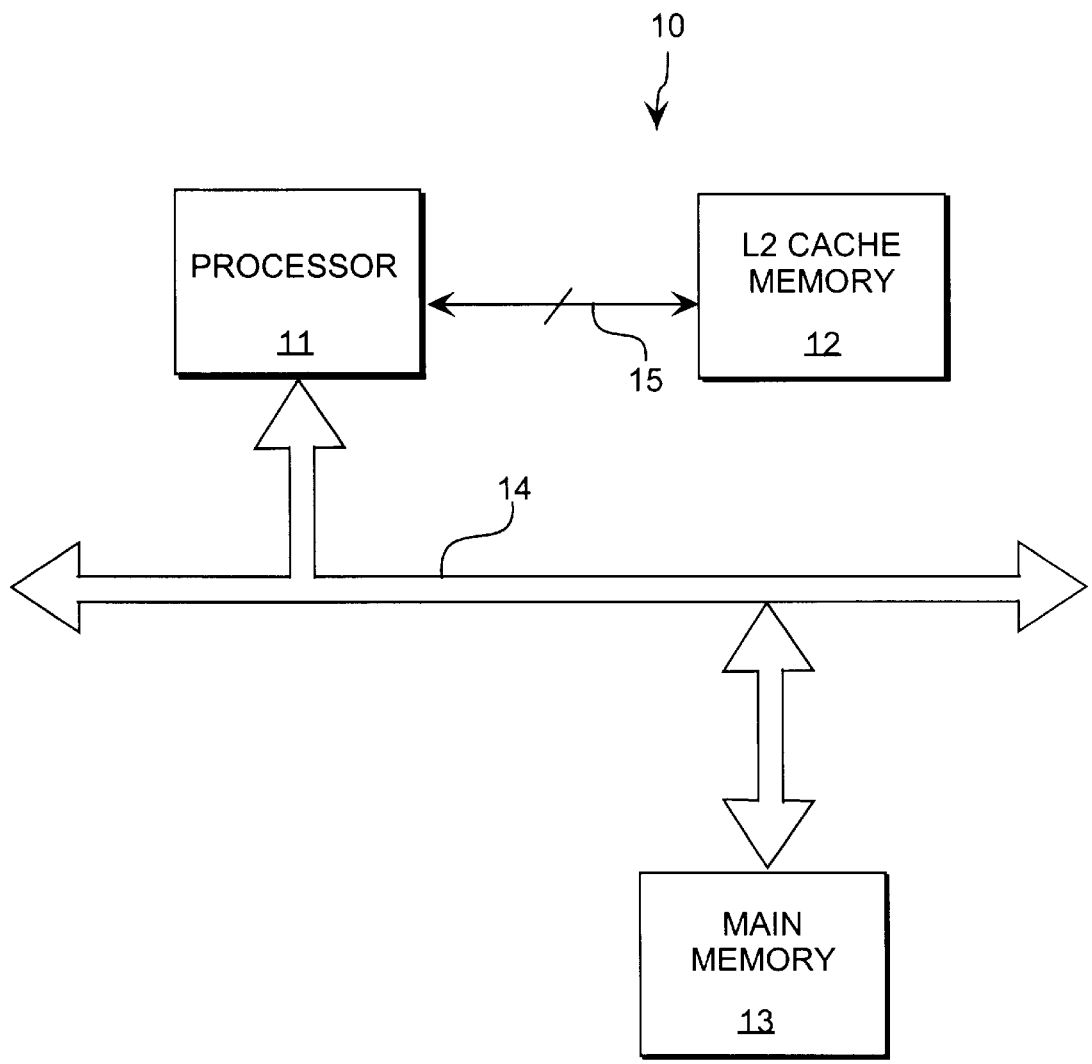
FIG. 1 illustrates a prior art cache memory system.
Figure 2:
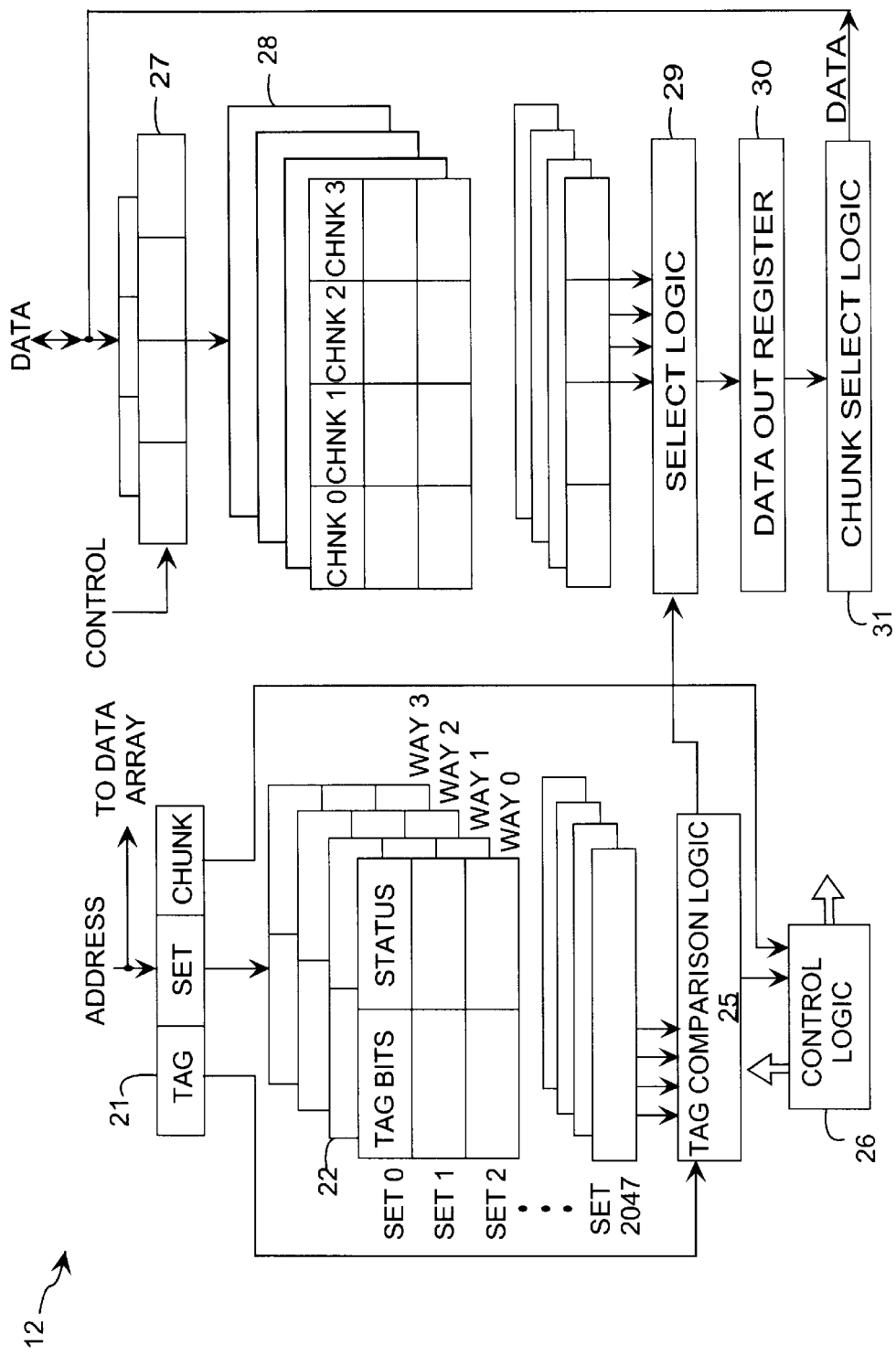
FIG. 2 is a block diagram showing details of a prior art secondary cache memory system.
Figure 3:
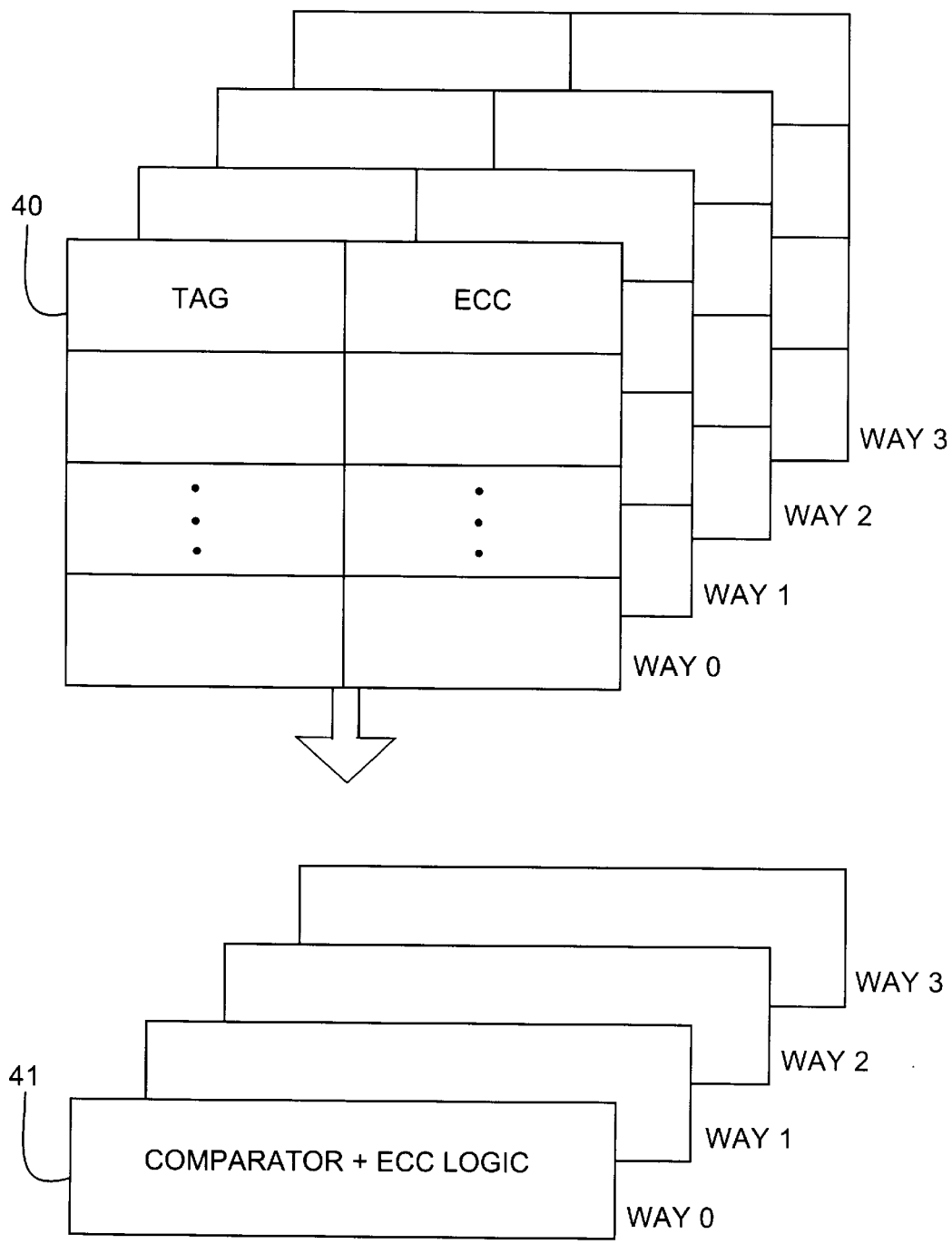
FIG. 3 is a block diagram that illustrates a cache memory tag array incorporating error correction code information.

Referring now to FIG. 3, one implementation of an error correction code in a tag array 40 of a cache memory is shown. FIG. 3 represents a 4-way set-associative L2 cache memory with only the tag portion being shown. Of course, tag array 40 is associated with a corresponding set of data array entries, as well as corresponding control logic. In the approach of FIG. 3, tag entries of each of the four ways for each address are accessed simultaneously to determine if a cache hit or a cache miss has occurred.

Note that the cache memory system shown in FIG. 3 includes an ECC code appended onto each tag array entry for each way. The ECC code provides error checks and corrections on an individual entry basis. This means that a different ECC code is used for each of the four way tags. Practitioners familiar with the cache memory arts understand that each way represents an independent set of data, so it is relatively straightforward to include ECC bits with associated ECC logic to protect the tag bits for each of the separate ways. For example, in a 4-way, 1 MB, L2 cache memory utilized with a 32-bit processor, the length of the tag entry is 18-bits long. This 18-bit tag entry requires 6 ECC bits to form a single-error correction (SEC) and a double-error detection (DED) code.

The result of the approach shown in FIG. 3 is a tag array area that is increased in size by as much as thirty-three percent (33%). Additionally, a comparator is required along with additional ECC logic for each of the four ways. The comparator is used for tag matching, i.e., for respectively comparing the tag entries in the array with a selected address. The ECC logic is utilized for detecting and correcting errors in the corresponding tag array. This is shown in FIG. 3 by block 41. To cover all ways, four sets of ECC logic required: one for each of the four ways. This results in an additional fifteen percent (15%) increase in area overhead. Note that the ECC logic included in block 41 includes well known logic circuits such as an ECC generator, syndrome generator, and error decoder and corrector circuitry.

Figure 4:
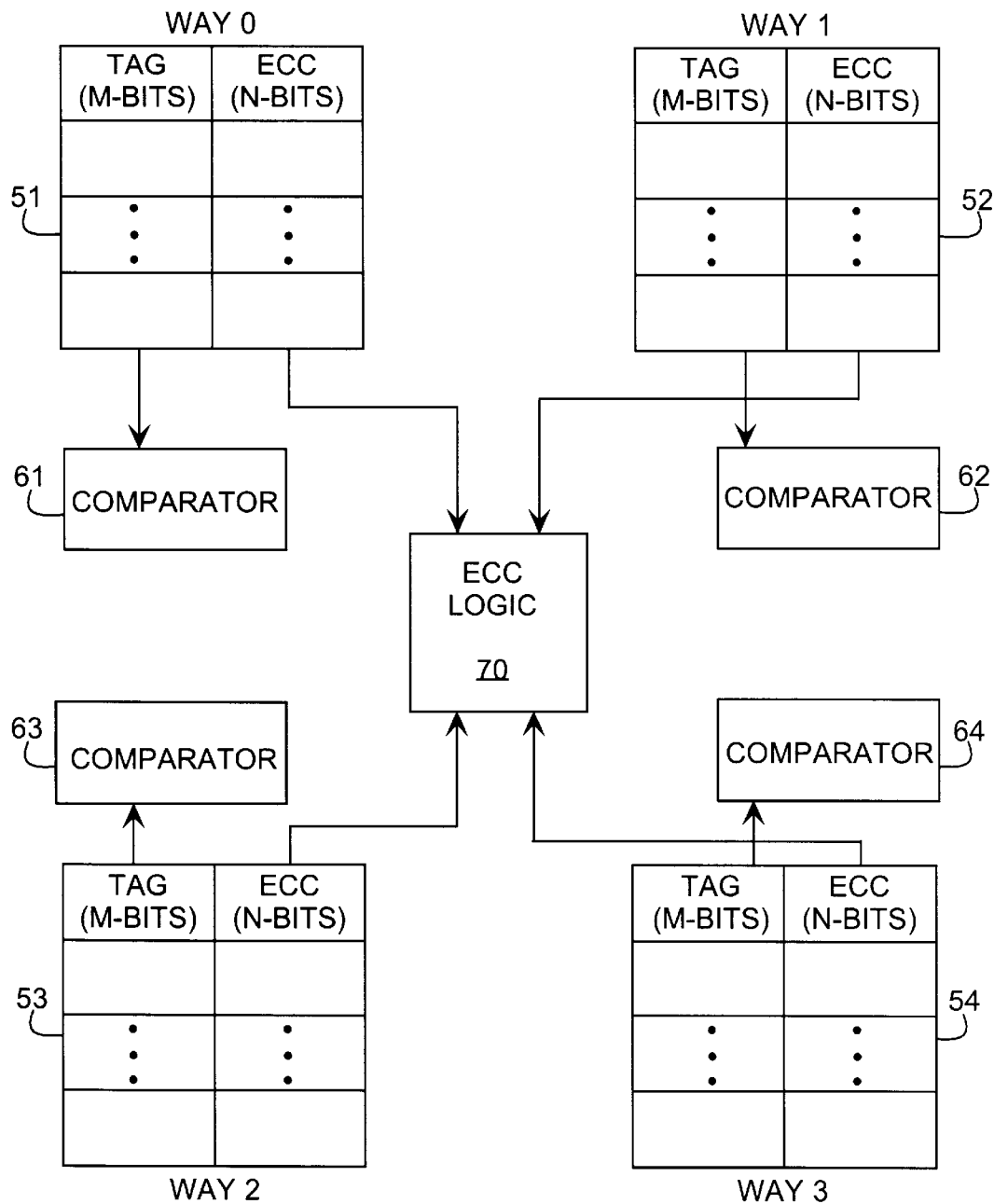
FIG. 4 is an architectural block diagram of one embodiment of the present invention.

FIG. 4 is an architectural block diagram of one embodiment of the present invention, which provides novel error correction for an integrated L2 cache tag array. The architectural scheme of FIG. 4 uses one set of ECC code to cover multiple ways of tag entries. By way of example, FIG. 4 illustrates a four-way, set-associative cache having tag arrays 51–54 corresponding to way 0–way 4, respectively. The single ECC code is evenly distributed among each of the ways in the embodiment of FIG. 4. That is to say, each tag array includes an N-bit portion appended to the M-bit tag entries. As a result, both the number of ECC bits and the ECC logic block 70 are greatly reduced.

In the exemplary embodiment of FIG. 4, a single ECC code is used to protect all four-way tags. In the situation where M is equal to 18 (i.e., 18-bit tag for each way) to cover 18×4=72 tag bits, only 8 ECC bits are required. These 8 ECC bits are distributed evenly among the four ways such that N=4 (4×2=8 ECC bits for a single ECC code covering 72 tag bits). Thus, practitioners in the art will appreciate that the architecture of FIG. 4 significantly reduces the area as compared to the correction scheme shown in FIG. 3.

Another benefit of the architecture of FIG. 4 is that only one ECC logic block 70 is needed with 70+8=80 inputs. This is compared to the four separate ECC blocks with 18+6=24 inputs for each logic block, as is the case for the scheme of FIG. 3. In other words, the overall area of ECC logic for the shared approach of the present invention is significantly smaller than the combined area of the four ECC logic blocks shown in the alternative approach. In most cases, the shared ECC logic block 70 is located in the middle of all four tag arrays 51–54. As mentioned earlier, the ECC bits are evenly distributed among the four ways in the illustrated embodiment. This particular embodiment also has the salutary effect of avoiding wiring congestion.

Note that each tag array 51 has an associated comparator for performing tag mashing. For instance, tag array 51 has an associated comparator 61, tag array 52 is coupled to an associated comparator 62, tag array 52 has an associated comparator 63, and tag array 54 is shown being coupled to an associated comparator 64.

Write access to the tag information stored in arrays 51–54 is somewhat different as compared to the approach shown in FIG. 3. In the scheme of FIG. 3, access to each tag array is entirely independent of every other array. In the embodiment shown in FIG. 4, however, a tag write (i.e., entry insertion) requires that the remaining three way entries be read first in order to generate new ECC bits. In a typical microprocessor this operation requires an extra clock cycle in order to write each of the four ways. Fortunately, since the tag write operation is not in the critical path of cache pipelines in most cases, the extra time consumed in the write operation does not impact processor performance. That is, most cache memories perform write operations in extra time that is available between other, more critical operations. In this respect, the read access to a tag array is often times the most critical access cycle in any memory design. In other words, the processor wants to obtain data quickly. Here, the distributed scheme illustrated in FIG. 4 does not incur any delay penalty in a read access operation. The reason why is because when a read access is performed, all ways are accessed together. It is during this access that the ECC is commonly checked. Therefore, a read access according to the architecture of FIG. 4 is every bit as fast as a read access performed in a more conventional architectural scheme.

Those familiar with cache memories will appreciate that greater advantages and benefits are realized in accordance with the present invention as cache size gets bigger. As L2 cache size increases, its associativity (number of ways) is often increased. This translates into even more significant area savings in the cache memory designed with a shared ECC scheme as disclosed in accordance with the embodiment of FIG. 4. Not surprisingly, on-chip cache memories have completely become the most area consuming blocks on a single die of a microprocessor. The present invention provides a very effective way to reduce the tag array size by sharing the ECC code in a distributed manner. Because of the substantial die area savings, the present invention is a significant advance in the art of on-chip cache design.

I claim:

1. A multi-way, set-associative cache memory comprising:

a data array;

a tag array that stores a plurality of entries for each way, each entry for a particular way including a m-bit tag and a n-bit portion of a single error correction code (ECC), the single ECC being shared among the ways so as to protect all ways of the m-bit tag;

ECC logic to detect an error in a particular entry of the tag array by computing the single ECC from the n-bit portions of all ways of the m-bit tag associated with the particular entry; and comparator logic associated with each of the ways of the tag array.

2. The cache memory of claim 1 wherein the data and tag arrays each comprise four ways.

3. The cache memory of claim 2 wherein the comparator logic comprises four separate comparators, each comparator being associated with one of the ways.

4. The cache memory of claim 1 wherein m=18.

5. The cache memory of claim 4 wherein n=8.

6. A multi-way, set-associative cache, which comprises: a plurality of data arrays, one for each way of the cache;

a corresponding plurality of tag arrays, all different ways of a tag being protected by a single error correction code (ECC), the single ECC comprising k bits that are distributed among the tag arrays;

ECC logic shared by the tag arrays to detect tag errors; and comparator logic associated with each of the different ways, the comparator logic being coupled to the tag arrays.

7. The multi-way cache of claim 6 wherein the k bits of the single ECC are evenly distributed among the tag arrays, with each tag array including an n-bit portion.

8. The multi-way cache of claim 7 wherein the tag comprises m bits.

9. The multi-way cache of claim 8 wherein m=18 and n=8.

* * * * *